Aug. 19, 1958  T. H. CALKINS ET AL  2,847,804
METHOD OF MAKING LENSES

Filed Jan. 25, 1957  3 Sheets-Sheet 1

INVENTORS.
TRACY H. CALKINS.
THOMAS S. HOOD.
BY
Lockwood, Galt, Woodard & Smith
ATTORNEYS.

Aug. 19, 1958     T. H. CALKINS ET AL     2,847,804
METHOD OF MAKING LENSES
Filed Jan. 25, 1957                                        3 Sheets-Sheet 2
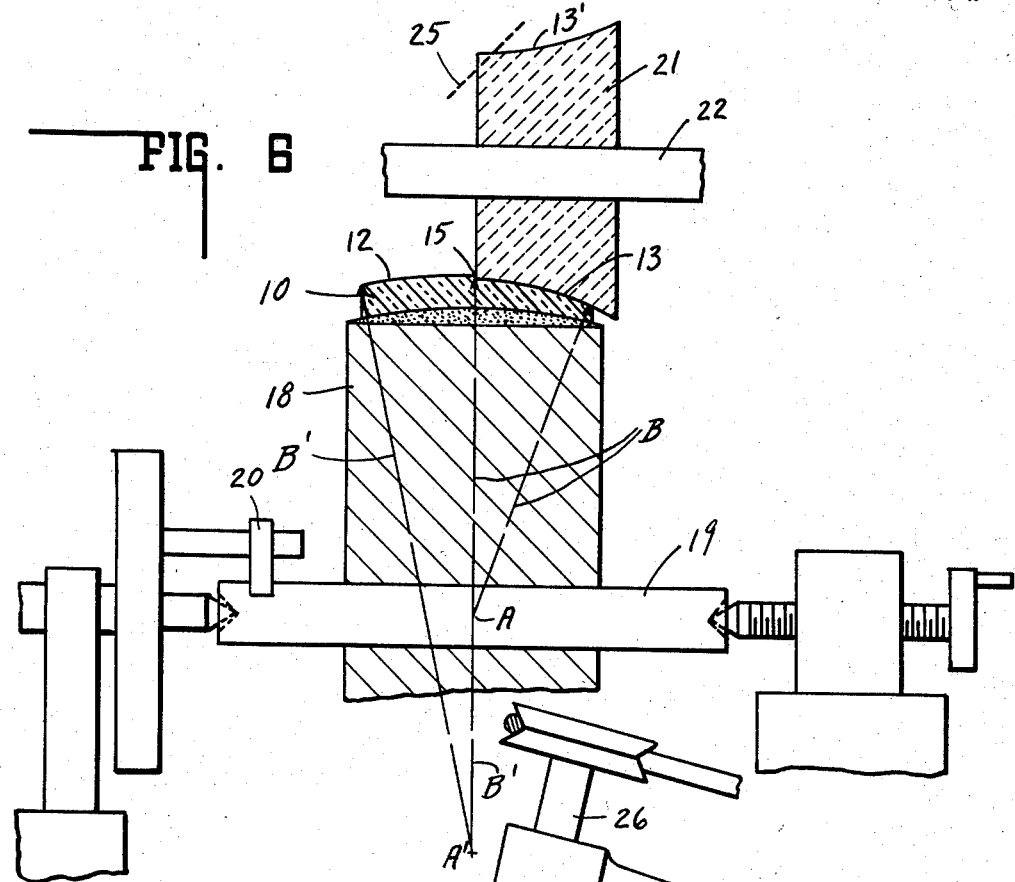
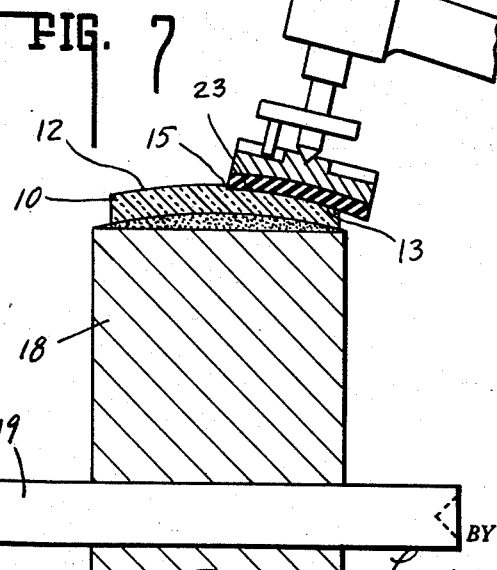
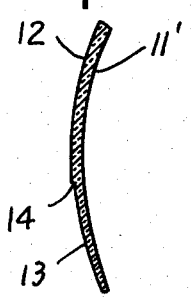
INVENTORS.
TRACY H. CALKINS.
THOMAS S. HOOD.
BY
Lockwood, Galt, Woodard & Smith
ATTORNEYS.

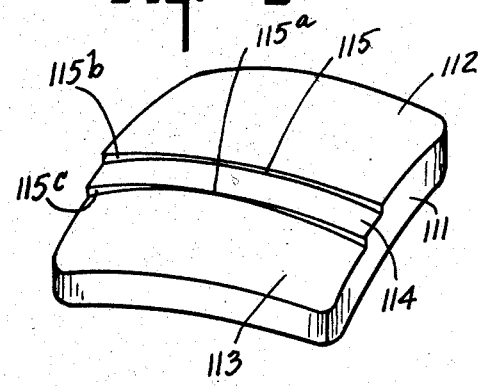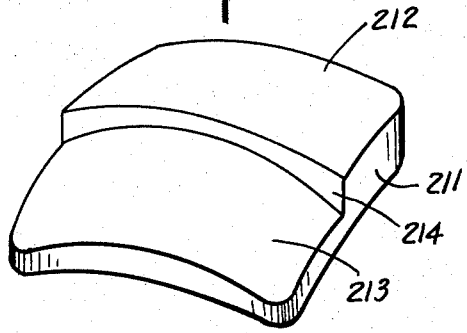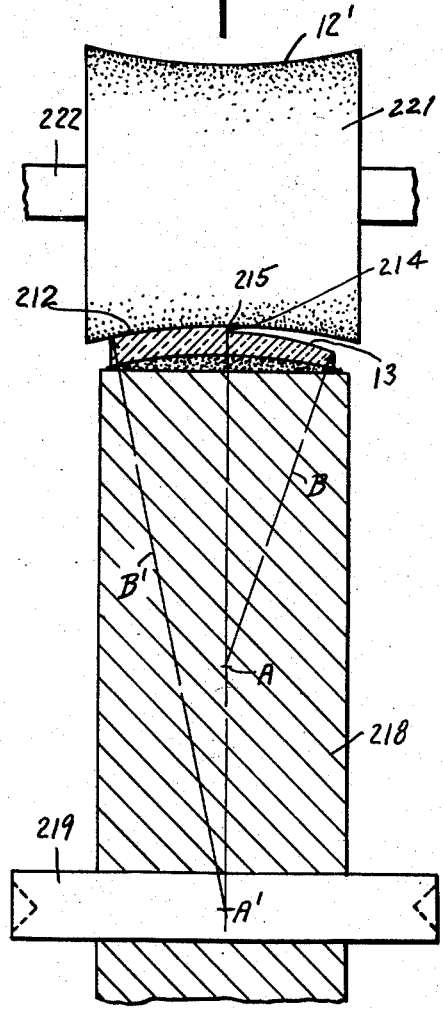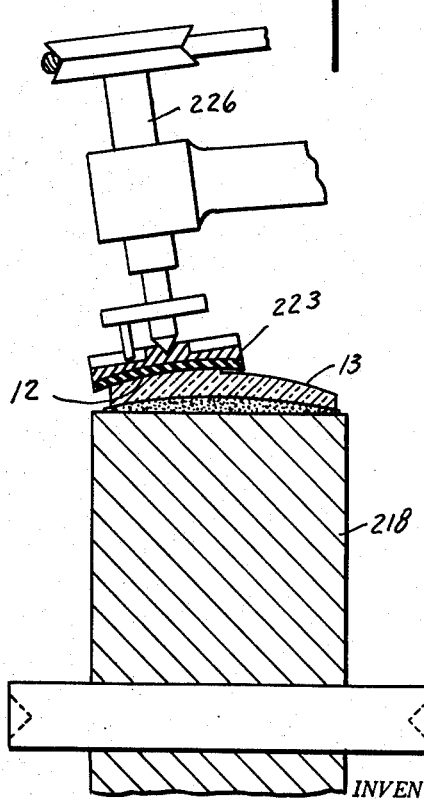

United States Patent Office 2,847,804
Patented Aug. 19, 1958

2,847,804

METHOD OF MAKING LENSES

Tracy H. Calkins and Thomas S. Hood, Indianapolis, Ind., assignors to Continental Optical Company, Inc., Indianapolis, Ind., a corporation Application January 25, 1957, Serial No. 636,336

1 Claim. (Cl. 51—284)

This invention relates to an improved method or process of making a one piece bifocal or multifocal lens blank which may be finally processed into a prescription lens, and particularly such a one piece bifocal or multifocal lens or lens blank having fields of different power joined by a straight line, reference being had to the bifocal lens and method of making the same disclosed in Letters Patent No. 1,951,506 granted March 20, 1934 on an application of Frank E. Duckwall.

The original bifocal of Benjamin Franklin was made by splitting two lenses of different type and fitting one-half of each in a frame whereby there was formed a straight line of joinder between the two fields of different power. Such a lens has good optical properties but many mechanical disadvantages. Lenses are also known which have a similar arrangement of fields meeting in a straight line but which are made of a single piece of glass. In this case, the bifocal or multifocal effect is obtained by grinding and polishing fields of different surface curvature. Such prior lenses have had these fields provided on the concave side, but they may also be provided on the convex side, the latter being preferred in this case.

The principal feature of this invention resides in a new and novel method of making a lens or lens blank of this type whereby the lens blanks are produced in multiple through a series of operations on the respective fields, instead of performing the operations on an individual lens blank as disclosed in the above Letters Patent. By performing the respective operations on a group of lenses simultaneously or in multiple, according to this invention, as distinguished from performing them on each individual lens blank, greater accuracy is obtained as well as economy in production. Furthermore, by reason of the method herein disclosed, a novel procedure of producing a straight line of joinder between the several fields is provided.

This invention is therefore concerned with the multiple or group production of lens blanks having two or more fields, one for distance vision and others for near vision or reading. The curvature on the reading field is greater than that on the distance vision field so as to provide greater power and give a reading addition. The two curves of said fields are approximately merged at the center of the lens blank but have a gradually increasing shoulder extending toward the edges thereof, substantially as shown in the above Letters Patent but as distinguished from the method therein disclosed which is necessarily applied to the production of each lens blank separately and individually.

In the method herein provided any number of blanks within mechanical limits, for example four blanks simultaneously as herein disclosed, may be processed to thereby improve upon the accuracy as well as the economic production thereof. For this purpose the desired number of blanks of optical glass may be mounted upon a suitable mounting tool to permit of the grinding and polishing of a spherical surface thereon to the prescribed thickness and base curvature for distance vision in one operation. Said blanks may then be removed and blocked about the periphery of a suitable wheel of predetermined size whereupon a grinding tool of predetermined cross curvature is applied to the spherical surfaces thereof over an area approximating one-half the width of the several blanks.

In this single operation upon a multiple series of blanks, approximately one-half of the surface of the respective blanks is thereby ground to a curvature of less radius and to a degree to provide a near vision area defined by a substantially straight line of demarcation. Such line of demarcation extends about the periphery of the wheel approximately midway between the outer edges thereof and centrally of the lens area of the blanks mounted about the wheel. The grinding tool which thus simultaneously grinds the near vision area on a plurality of lens blanks has its grinding face of predetermined cross curvature such as to develop said greater curvature of the near vision area. Said multiple groups or plurality of lens blanks mounted on the wheel are thus ground by said grinding tool until the desired area of greater curvature substantially merges with the base curvatures of the blanks at the approximate center of the lens area. The resulting straight line of demarcation separating said areas forms opposed shoulders increasing in depth from the merged portion toward each side of the blank.

Thus the near vision area will be ground by said tool operating upon a group or plurality of lenses carried by the wheel to grind the near vision area in accordance with the cross curvature of the multiple grinding tool. Thereafter the ground surfaces of the blank may be polished through the same multiple blank operation until any line of demarcation at the point of merger of said surfaces is eliminated if desired.

Following such multiple lens blank operations, they may then be individually ground and cut to prescription to provide the finished lens.

The full nature of the invention will be understood from the accompanying drawings and the following description and claims:

Fig. 6 is an enlarged central vertical section through a portion of the wheel illustrating the application of the grinding tool of predetermined cross curvature to the near vision area of the blanks blocked thereon;

Fig. 7 is the same as Fig. 6 showing the application of a finishing tool to the near vision area while the blanks remain blocked on said wheel;

Fig. 8 is a section through a finished lens made from said blanks;

Fig. 9 is a perspective view of a finished trifocal lens blank.

Fig. 10 is the same as Fig. 1, illustrative of a partially finished blank according to a modified method.

Fig. 12 is the same as Fig. 6 illustrative of said modified method.

Fig. 13 is the same as Fig. 7 illustrative of said modified method.

Figure 1:
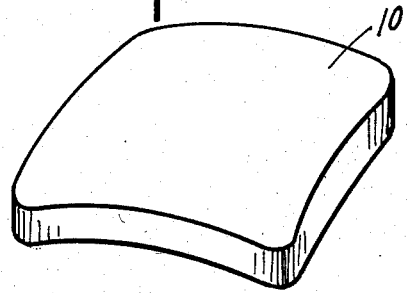
Fig. 1 is a perspective view of an unfinished lens blank.
Figure 2:
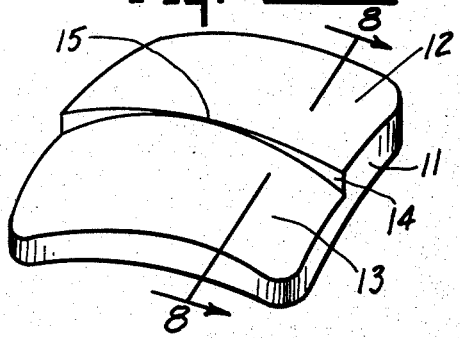
Fig. 2 is a perspective view of a bifocal finished blank following the processing thereof.

The method comprising this invention is illustrated serially by means of the accompanying drawings wherein Fig. 1 shows the unfinished blank of optical glass 10 which is processed into a finished bifocal blank 11, as shown in Fig. 2, having a distance vision field 12 and a near vision or reading field 13 separated by a straight line of demarcation extending transversely from side to side as indicated by the shoulder 14. The two surfaces substantially merge centrally of the blank as indicated at 15, the shoulders gradually increasing in depth from point of merger to the lateral edges of the blank.

However, as hereinafter more particularly described and as shown in Fig. 9, a finished blank 111 may be produced as a trifocal lens blank having a distance vision field 112, a near vision or reading field 113 and an intermediate field 114, all merging centrally of the lens as indicated at 115 and 115a, but separated toward the sides of the lens by the respective shoulders 115b and 115c.

Figure 3:
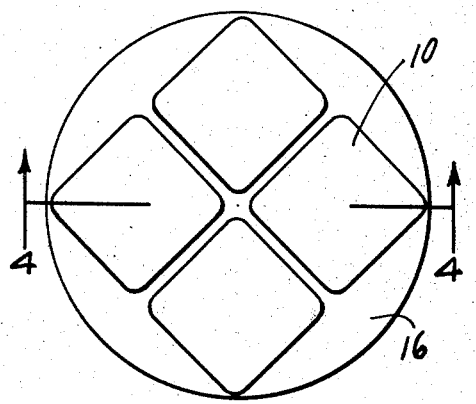
Fig. 3 is a plan view of reduced dimensions showing the blocking of a plurality of unfinished blanks, as in Fig. 1, on a mounting tool.
Figure 4:
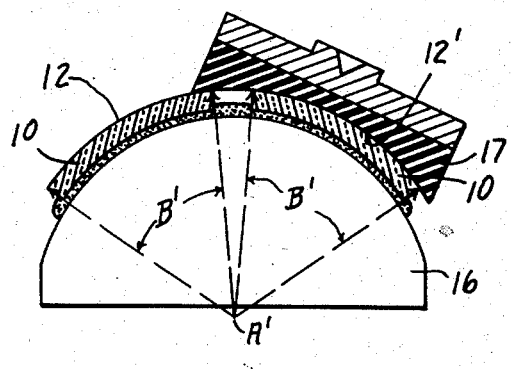
Fig. 4 is a central vertical section through the mounting tool of Fig. 3 with a grinding and polishing tool applied to the blocked blanks.

In producing the finished blank of Fig. 2, a plurality of blanks 10 as shown in Fig. 1 are mounted or blocked on a mounting tool 16, there being four such blanks blocked thereon in the usual well known manner, as shown in Fig. 3. Said blanks are simultaneously ground through application thereto of a grinding and polishing tool 17 such as to grind them to the same thickness and develop the desired base curvature for providing the convex distance vision area 12. For this purpose, tool 17 is provided with a grinding and polishing surface 12' having a desired predetermined radius of curvature indicated at B' and movable about the center of curvature A' as indicated in Fig. 4.

Figure 5:
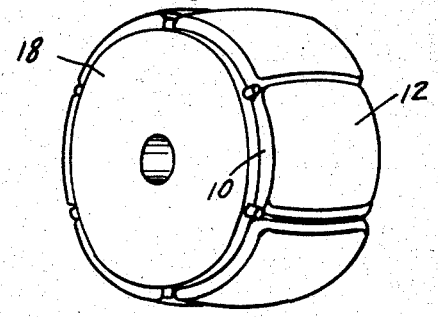
Fig. 5 is a perspective view of the wheel of predetermined diameter by which a plurality of blanks are mounted after having been ground and polished to the distant vision field curvature on the mounting tool of Figs. 3 and 4.

The above method may be referred to as the "head" method of making spherical surfaces. Another method, which is also multiple, is to block the lens blanks around a wheel similar but larger than the wheel 18, as shown in Fig. 5. Then by grinding and polishing a spherical surface on the lenses of this wheel as the wheel rotates about its axis, the desired distance spherical surface may be obtained on all the lens blanks. Another method, at this point, would be to process the surface 12 on each blank individually as above mentioned.

With the distance, vision area 12 thus developed, said blanks of a constant thickness are de-blocked and mounted about the periphery of the wheel 18, as shown in Fig. 5. The wheel 18 is mounted for rotation by the shaft 19, Fig. 6, to be rotated as schematically indicated by the driver 20. Said wheel has a predetermined radius such that the crown of the ground surface of the respective lenses will be equal to the radius of curvature of the near vision field 13 to be ground thereon, and as indicated by the letter B, with the radius of curvature B' of the surface 12 projecting through the center of the lens and through the center of curvature A of the near vision field 13. When blocked on the wheel 18, the exposed surface 12 of each blank will have a radius of curvature B' and center of curvature A' with the radius passing centrally through the blank projecting through the center of radius A of the near vision field to be ground. With the blanks thus mounted on the wheel a grinding tool 21 is applied, as shown in Fig. 6. Said grinding tool is carried by a suitable spindle 22 and is formed with the peripheral grinding surface 13' conforming to the near vision field 13 to be ground with its center of curvature at A and with the radius B. Thus the cross curve of the grinding tool is radially equal to the cross curve of the finished surface 13 and the predetermined radius of the wheel and blank. Upon rotation of the wheel carrying the series of blanks, and the grinding tool 21 being applied to approximately one-half of the lens area, the near vision field 13 will be ground to a curvature of the radius B whereas the far distance field 12 will remain with a greater radius of curvature B'. Due to the fact that the cross curve radius of the grinding tool is equal to the radius of the wheel and blank, a spherical surface 13 will be developed wherein the cross curvature of the surface 13, being of less radius than the surface 12, will cause the corresponding side portions of the blank to be ground down in the fashion shown in Fig. 2, leaving the shoulders 14, until the central portion along the line of demarcation between the surfaces will closely approach merger at the point 15.

With the blank still mounted upon the wheel 18 rotated by shaft 19, and as shown in Fig. 7, a finishing tool 23 for lapping or polishing may be applied to the ground near vision areas 13 for finishing the reading surfaces of the lenses and causing the respective surfaces 13, 12 to substantially merge one into the other at point 15 so as to be practically indistinguishable at this point while separated by the shoulders 14 on each side thereof. For this purpose, said tool is provided with a spherical lapping or polishing surface having its center or curvature at A and radius B to conform to the curvature of surface 13. Upon completion of the finishing operation by said tool, the blanks are de-blocked from the wheel 18 resulting in the finished blank of Fig. 2.

In establishing the radius of the wheel 18 which necessarily limits the multiple number of group of blanks to be processed thereon, account is taken of the thickness of the blank 10 and its convex surface curvature. As shown in Fig. 6, the radius of the wheel is such that when the blanks are blocked about its periphery, the radial line B extending from its axial center to the crowns of the respective blanks as indicated at 15 in Fig. 6 will be the prescribed radius to be developed in the near vision portion, i. e. the radius of curvature of the grinding tool 21 and the cross curvature of the near vision surface to be ground. Thus the grinding tool 21 will generate a cross curve of the near vision area having the radius B while the relative rotation of the wheel 18 will cause the transverse curvature to be ground to the radius B.

It will be observed from the foregoing that a plurality or group of finished blanks are processed simultaneously by the same tool for each operation as distinguished from each blank being processed individually. As shown herein, for illustration, a group of four blanks are processed simultaneously for developing the distance vision area. Then in the second surface operation a multiple number or group of such developed blanks may be processed while mounted on a wheel of the type shown in Fig. 5. The number of blanks that may be simultaneously processed is only limited by the diameter of the blank and the spherical surface curvatures that are desired to be developed upon it.

As shown in the modified form of blank of Fig. 9 wherein a trifocal lens blank is developed, there is illustrated such a blank 111 having a far distant vision field 112, a near vision field 113 and an intermediate vision field 114. Said fields are separated by the straight line shoulders 115b and 116c respectively, with their central surfaces merging at 115 and 115a respectively. In processing the trifocal lens of Fig. 9, the far vision field 112 is generated or ground in the manner above described with respect to Figs. 3 and 4.

The intermediate field 114 is next ground and lapped or polished by blocking a group of blanks on a wheel which is similar to but of greater diameter than wheel 18 and which will, by following the above described process, yield a surface of greater curvature than the distance portion, yet lesser than the desired reading portion. The blanks, after being finished in the previously described way, are removed from the wheel and re-blocked on a wheel of still lesser diameter such as wheel 18 and the process repeated to obtain the reading area with still greater curvature.

Figure 11:
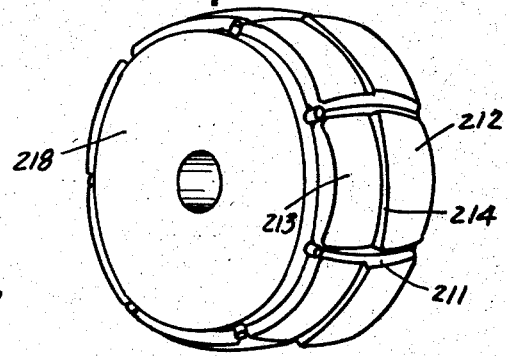
Fig. 11 is the same as Fig. 5 illustrative of said modified method.

If it should be desired to provide beveled or curved shoulders 14 or 15b, 15c, as shown in Figs. 8 and 11 respectively of the above mentioned patent, it is only necessary to provide the grinding tool 21 of Fig. 6 with a beveled or curved inner edge as indicated by the dotted line at 25 in Fig. 6.

While the invention has been described as calling for the steps of first grinding the far vision field 12 throughout the entire lens area, as shown in Fig. 4, followed by the grinding and lapping or polishing of the near vision area 13, as shown in Figs. 6 and 7, the steps of the method may be reversed wherein the blank of Fig. 1 is first blocked on a wheel similar to wheel 18 and the near vision field is ground to provide the spherical surface with the radius B and the center of radius at A as in Fig. 6, followed by the lapping or polishing operation by button 23. At this point, the far vision field will not have been generated. The group of blanks may then be de-blocked from the wheel and blocked on a holder for application of the grinding tool having a spherical surface of a greater radius as indicated by the radius B' with its center of curvature at A'. Said tool will then grind the far vision area to its prescribed curvature free of and without touching the previously completed near vision area 13, reference being had to Figs. 10 to 13 inclusive. By this alternate method, the blank may be made by first processing the near vision or reading area and thereafter processing the far vision area in the case of a bifocal, or thirdly, in the case of a trifocal.

In this modified method schematically illustrated by Figs. 10 to 13 inclusive, the blanks are first blocked on a wheel such as wheel 18 of Fig. 5 and processed as shown in Fig. 6 to produce by a grinding tool 21 the near vision area 13 with its spherical surface of the radius B. The resultant blank is illustrated in Fig. 10 wherein the near vision area thus processed is indicated at 13 on the blank 211. This leaves a decided shoulder 214 separating the finished near vision area 12 from the unfinished far vision area 212. However, in the finishing of the near vision area 13, a finishing tool 23 is applied thereto as illustrated in Fig. 7 to lap and polish the ground near vision area. Thus in this modified method, the near vision area is first finished in a manner illustrated and described in respect to Figs. 5, 6 and 7 with the finishing tool 23 being adjusted so that its periphery would polish up to the shoulder 214.

The partly finished blanks would then be de-blocked and re-blocked on a wheel 218 as shown in Figs. 11 and 12. This wheel would be of greater diameter than wheel 18, the radius being computed so that when the lens blanks have been ground to a finished spherical dimension as required over the distance vision area, the distance of the surface 212 from that of the near vision area 13 would be a minimum at the merging point, as indicated at 215. In practice such distance would range, upon completion of the processing, from substantially zero to .010 of an inch.

After said blanks have been blocked on the wheel 218, said wheel is mounted on the shaft 219, Fig. 12, and the surface 212 is engaged by the grinding tool 221. Said tool has a cross curvature of the radius B', and is mounted in a manner to have its center of curvature at A' lying substantially on a line joining the point 215 with the center of curvature A of the near vision area radius of curvature B'. Since the radius B' of the distance area will always be longer than radius B of the near vision area, the grinding tool will clear the surface 13 of the lens blank. The wheel 218 carrying the blanks is rotated by the shaft 219 and the grinding tool 221 is rotated by the shaft 222. The grinding tool is advanced against the blank until the spherical surface 12 is attained, thereby completing the finished blank of Fig. 2 through a reversal of the method steps.

However, to finish the surface 12 by lapping and polishing following the grinding operation, the wheel 218 on its shaft 219 is applied to the finishing tool 223 rotated by shaft 226, as shown in Fig. 13, and in all respects similar to that step in the method illustrated by Fig. 7. However, as heretofore noted, surface 12 may be ground and polished by the methods mentioned in respect to Figs. 3 and 4. Following such final finishing operation the lens blanks, as in Fig. 2, are removed from the wheel.

In producing trifocal blanks by this method, a third wheel (not shown) in addition to the wheels 18 for processing the near vision and the wheel 218 for processing the distance vision area would be employed. Such third wheel would be in all respects the same as those above described and employed in precisely the same manner other than its dimensional characteristics would differ whereby it would have a diameter smaller than the wheel 218 employed for the distance vision portion and larger than the wheel 18 employed for developing the near vision portion. Thus the dimensional characteristics of such third wheel, particularly as to radius, would be computed to give the desired curvature to attain the intermediate field in the manner above described.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claim.

The invention claimed is:

The method of making one piece multi-focal lens blanks having distance and near fields of vision separated by straight line shoulders substantially merging at central points, consisting of blocking a plurality of unfinished blanks of optical glass about the peripheral surface of a blocking wheel, said wheel having a radius approximating the radius of the near field to be ground, applying to the near field portions of said blanks a rotating grinding wheel having a grinding surface line on the edge thereof of predetermined radius of cross curvature corresponding to the radii of said near fields to be ground, rotating said blocking wheel and said fields until the radius of spherical curvature of each said near field equals the radius of curvature of said grinding wheel, deblocking said blanks and blocking them about the periphery of a second blocking wheel having a radius approximating the radius of the distance field of vision, applying to the distance field portions of said blanks a second rotating grinding wheel having a grinding surface line on the edge thereof with a radius of cross curvature corresponding to the radius of said distance field of vision, rotating said second blocking wheel and grinding each lens blank in succession until the spherical radii of curvature of said distance field portions equal the radius of cross curvature of said second grinding wheel and until said fields of vision substantially merge at one point and are separated by straight line shoulders increasing in depth from said merging point toward the sides of said blanks.

References Cited in the file of this patent

UNITED STATES PATENTS

| | | |
|---|---|---|
| 1,483,866 | Bugbee | Feb. 19, 1924 |
| 2,310,925 | Bardwell et al. | Feb. 16, 1943 |